April 21, 1953  F. R. EICHNER  2,635,501
HOLLOW RIVET

Filed March 30, 1951  2 SHEETS—SHEET 1

Inventor
Ferdinand R. Eichner
By Willits, Helmig & Baillio
Attorneys

April 21, 1953      F. R. EICHNER      2,635,501

HOLLOW RIVET

Filed March 30, 1951      2 SHEETS—SHEET 2

Inventor
Ferdinand R. Eichner
By Willits, Helmig & Baillio
Attorneys

Patented Apr. 21, 1953

2,635,501

UNITED STATES PATENT OFFICE 2,635,501

HOLLOW RIVET

Ferdinand R. Eichner, Pontiac, Mich., assignor to General Motors Corporation, Detroit, Mich., a corporation of Delaware Application March 30, 1951, Serial No. 218,428

2 Claims. (Cl. 85—40)

This invention has to do with improvements in rivets of the type used in aircraft and bus fabrication and similar manufactures and is concerned particularly with rivets specially designed for "blind" riveting. So-called "blind" rivets are used in applications where the form or condition of the material to be riveted prevents access to the inner end of the rivet so that the inner end cannot be supported for upsetting or enlargement. This condition is frequently encountered in bus and aircraft construction wherein sheet metal is to be riveted to tubular members or to each other. In such instances the inner end of the rivet must be capable of end expansion on the blind side when worked upon solely from the open side of the work being riveted.

The invention relates more particularly to tubular rivets, the inner ends of which are adapted to be expanded to an enlarged size greater than the opening through which the rivet is inserted by means of pins extending through the bore of the rivet. Such rivets, generally, are old in the art and well known. The uses for such rivets have heretofore been restricted due to the relatively low tensile and shear strength thereof. More particularly, in many applications where such rivets have been subjected to shear loading, failure of the rivet has been found to occur due to tension rather than shear failure in that the tension forces acting upon the rivet causes the pin to fly out from the tubular portion prior to the development of the maximum shear stress for which the rivet is designed. This type of rivet failure occurs frequently when conventional "blind" rivets are used to fasten the sheet metal side panels of busses to the bus supporting structure. In operation of the bus, the side panels may sometimes be subjected to sufficient torsion to cause rivet failure in the manner heretofore described.

When rivets are subject to shear stress, axial stress in tension results, tending to cause the pin and tubular member to separate. It is therefore of great importance that the pin and tubular member resist axial stress in tension so that the rivet may be capable of withstanding the full shear stress for which it is designed without premature separation of the pin and tubular member. To this end the invention contemplates a two-part rivet structure wherein one of the parts extends outwardly on the open side of the work and in contact with the other part, thereby more firmly gripping the other part and presenting a surface particularly adapted for spot welding so that the two parts may be quickly and easily welded together after the rivet joint has been formed.

More specifically, the present invention contemplates a pair of rivet parts, one within the other, which may quickly and economically be welded together in large scale production after the riveted joint has been completed.

A further object of this invention is to provide a rivet structure of simple and practical construction which may be economically produced and including a pin member and a tubular member in which the tubular member includes a stem portion extending outwardly around the pin member and in contact therewith and presents a surface adapted to be quickly and economically welded to the pin member after the riveted joint has been formed.

An additional object of this invention is to provide a blind rivet having a head formed on both the blind side and open side of the work and having the parts of the rivet welded to each other at the open side of the work.

Another object of this invention is to provide a blind rivet having a tubular head portion and a pin contained therein, and in which the tubular head portion is provided with an annular stem extending outwardly from the open side of the rivet head to provide more positive purchase of the tubular head portion upon the pin portion than is found in blind rivets of conventional construction.

The foregoing and other objects and advantages of the invention will be apparent from the following description and claims taken in conjunction with the accompanying drawings in which:

Figure 1:
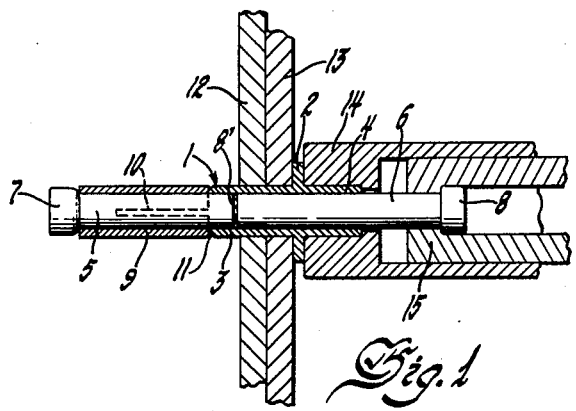
Figure 1 is a side view of a preferred form of rivet constructed in accordance with the principles of this invention, the stem portion thereof being shown in elevation and the outer tubular portion being shown in section.

Referring now to the preferred embodiment illustrated in Figures 1 through 5, and wherein like members are used to designate similar parts in the various views, there is shown a tubular member designated generally by the numeral 1 and consisting of a radially extending flange or head 2 having a pair of axially extending tubular stem portions 3 and 4 formed integrally with the head portion and extending from opposite sides thereof. A pin member formed of two sections 5 and 6 is slidably positioned within the bore of hollow tubular member 1. A bulbous head 7 of greater diameter than that of the bore of tubular member 1 is formed on pin section 5, while a head 8 is formed on the pin section 6. An annular groove 8' is provided at the juncture of the two pin sections. A sleeve 9 provided with a slot 10 is fitted over stem section 5 of the pin. The head 7 has rounded or cammed edges bearing against sleeve 9. Stem portion 3 is chamfered at 11.

In Figures 1 through 4, the annular stem 3 is illustrated as projecting through a drilled opening in a pair of plate members 12 and 13 to be riveted. Pin section 5 and sleeve 9 project outwardly beyond the plates 12 and 13 at the blind side of the work. 14 and 15 represent the jaws of a riveting machine of well-known construction, jaws 14 acting to force the head 2 tightly against plate 13 while jaws 15 act to apply tension to pin section 6 by pulling upon head 8. These riveting machines may be operated pneumatically or hydraulically in order to apply sufficient tension to draw the pin section 5 through the tubular stem portions 3 and 4 to the position illustrated in Figure 3.

Figure 2:
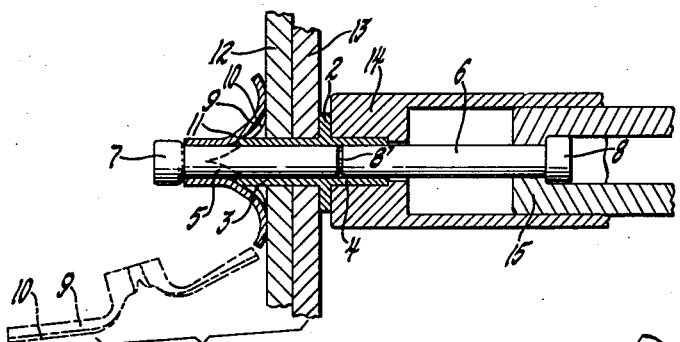
Figure 2 illustrates the pin portion of Figure 1 after having been partially drawn through the tubular member to force the tubular member into close contact with the plates being riveted.

In forming the riveted joint the sleeve 9, under influence of tension force applied to the pin, spreads outwardly as illustrated in Figure 2 to contact the plate 12 at the blind side of the work. The sleeve, therefore, together with head 2 force the plates 12 and 13 closely together as the pin section 5 is being drawn through the tubular head. As head 7 approaches stem portion 3, the sleeve 9 breaks off and head 7 contacts stem portion 3.

Figures 3, 4:
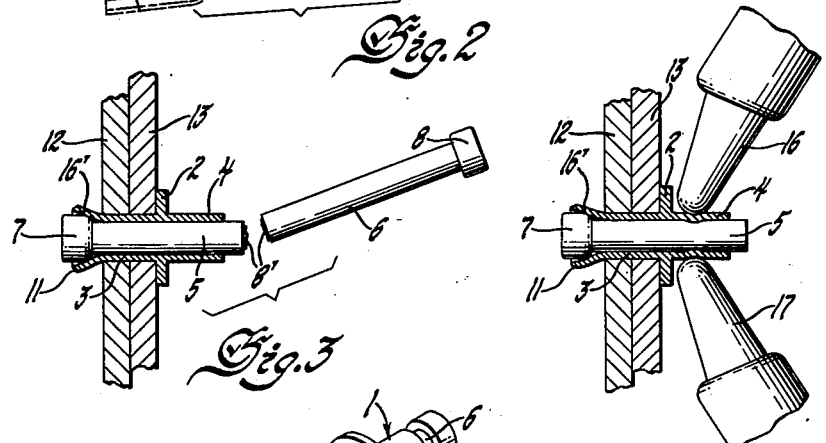
Figure 3 illustrates the riveted joint after upsetting of the tubular head on the blind side of the work has been completed.
Figure 4 illustrates the step of welding the tubular stem on the open side of the work to the pin after the formation of the riveted joint.
Figure 5:
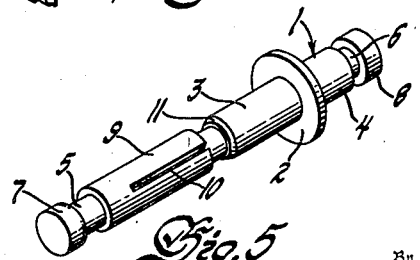
Figure 5 illustrates the rivet before use.

Continuing the application of tension force to pin section 6 causes bulbous head 7 to spread stem 3 at the blind side of the work, thereby locking the stem section as illustrated in Figure 3. Groove 8' is provided to assure that pin section 6 cannot be pulled with sufficient force to break off the head formed at the blind side of the work or damage the bearing surface between the head and plate 12. The groove 8' is cut a sufficient distance to assure that pin section 6 will break off from pin section 5, under influence of tension force applied to pin section 6, after the head 16' is formed at the blind side of the work.

The riveted joint illustrated in Figure 3 has greater strength than joints formed by "blind" rivets of conventional construction due to the action of sleeve 4. The additional purchase of sleeve 4 upon pin 5 at the open side of the work assists in preventing the pin from flying out of the tubular portion due to tension forces acting upon the pin when the riveted plates are subjected to shear stress. The sleeve 4 also provides a surface area at the open side of the work readily available and adapted for welding so that the head at the open side of the work may be quickly and economically welded to the pin after the riveted joint has been formed. The welding of the stem to the head may be accomplished as desired, but for simplicity and economy of manufacture, spot welding is preferred. 16 and 17 represent the electrodes of a spot welding machine positioned to accomplish welding of stem 4 to pin section 5. With a riveted joint formed in accordance with the teachings of this specification, the pin is positively locked to the rivet head at opposite sides of the work, thereby providing a joint of maximum strength. Actual tests upon riveted joints formed as described show that when the plates are subjected to sufficient tension, failure will occur due to failure of the bearing surface of the plates rather than due to separation of the pin from the rivet head. Maximum shear forces of which the rivet is capable of withstanding are developed before rivet failure occurs.

Referring now to Figures 6 through 10, there is shown an alternative form of the invention in which the pin member is modified to provide for radial expansion of the tubular head member as the stem is drawn through the head member prior to the formation of the head at the blind side of the work. In this embodiment the sleeve 9 of the previously described embodiment is omitted.

Figure 6:
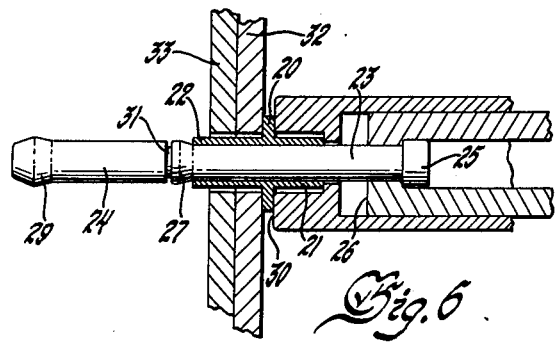
Figure 6 is a side view of an alternative form of rivet, the stem portion thereof being shown in elevation and the outer tubular portion being shown in section.

As shown in Figure 6, the rivet is inserted into an opening in a pair of plates to be riveted. The tubular member is similar to that previously described in that it includes a radially extending flange or head 20 having a pair of axially extending tubular stem portions 21 and 22 formed integrally with the head portion and extending outwardly at opposite sides thereof. A pin member formed of sections 23 and 24 is telescopically contained within the bore of the tubular member. Pin section 23 is provided with a head 25 at one end thereof adapted to be gripped by a jaw 26 of a riveting machine so that the pin may be pulled through the tubular member. At the opposite end of pin section 23 and external of tubular stem 22, a bulbous head 27 is formed, the diameter of head 27 being greater than that of stem portion 22. A pin section 24 extends outwardly from head 27, the stem section 24 being of substantially the same diameter as that of head 27. An enlarged bulbous head 29 is formed on the end of pin section 24. The riveting machine is provided with a jaw 30 adapted to force head 20 against one of the plates to be riveted together when jaw 26 is caused to apply tension to head 25. A groove 31 is provided between pin sections 23 and 24 for the same purpose as groove 8 of the embodiment shown in Figures 1 through 5 and heretofore explained. Plate 32 represents the plate at the open side and plate 33 represents the plate at the blind or inaccessible side of the work.

Figure 7:
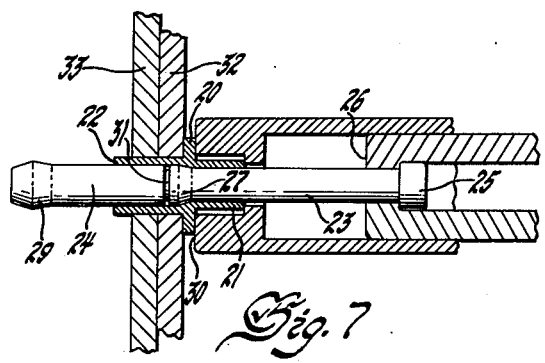
Figure 7 illustrates the rivet of Figure 6 after the pin member has been partially drawn through the tubular member to expand the tubular member radially into close contact with the plates being riveted.
Figure 8:
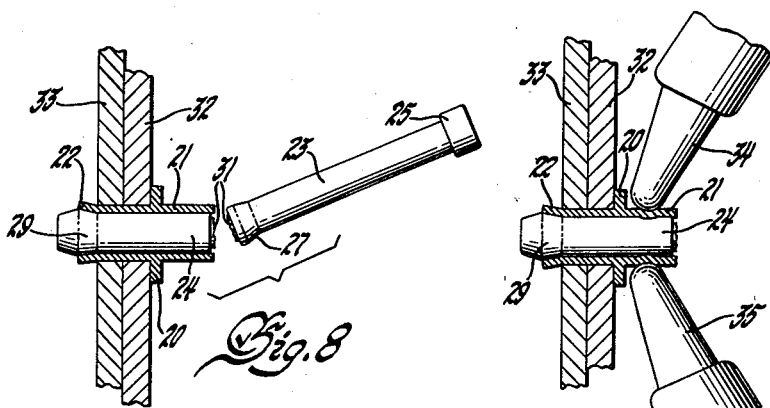
Figure 8 illustrates the riveted joint after upsetting of the tubular head on the blind side of the work has been accomplished.

In forming the riveted joint, pin section 24 and stem 22 are inserted in a drilled opening in the members to be riveted so that stem 22 protrudes outwardly on the blind or inaccessible side of the work. As tension is applied to head 25, head 20 is forced against plate 32 by jaw 30. The expansion of the tubular member occurs in two steps. First, bulbous head 27 is drawn through stem portions 22 and 21 to expand the same radially in order to insure a tight fit of tubular stem 22 against the work being riveted. This is illustrated in Figure 7. As pin section 24 is pulled through the tubular head member, bulbous head 29 is forced into stem 22, thereby spreading the stem to form a head on the blind side of the work. As the resistance increases due to formation of the head at the blind side of the work, pin section 23 breaks away from section 24 as illustrated in Figure 8. In this embodiment, as in that of Figures 1 through 5, the riveted joint is formed with tubular section 21 protruding outwardly from head 20 both to grip the pin section 24 and to provide a surface readily available for welding purposes.

Figure 9:
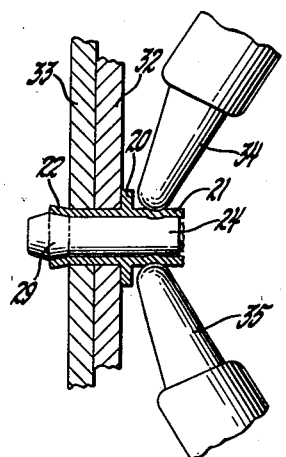
Figure 9 illustrates the step of welding the tubular stem on the open side of the work to the pin.
Figure 10:
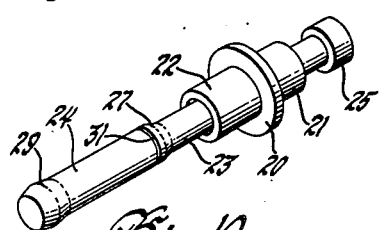
Figure 10 illustrates the rivet before use.

Figure 9 illustrates a pair of welding electrodes 34 and 35 applied to stem 21 for the purpose of welding the stem to the pin. By providing a pin form as illustrated in Figures 6 through 10 to first expand the tubular head radially and to thereafter upset the stem 22 to form the head on the blind side of the work, a more solidly riveted joint is achieved in that a tight fit of the tubular member in the work is assured and undesirable tearing of the tubular sleeve is prevented.

The invention is not to be construed as limited to the specific structural details disclosed herein, but is capable of other modifications without departing from the spirit and scope of the appended claims.

I claim:

1. In a blind rivet, a tubular member adapted to extend through holes in workpieces to be riveted and having a flange adapted to abut one of said workpieces on the open side thereof, a pin in said member, said pin adapted to extend beyond the blind side of the workpieces and having an enlarged portion thereon, and a sleeve having frangible and deformable sections positiontioned on said pin between the enlarged portion of said pin and said tubular member, said enlarged pin portion having cammed edges adjacent said sleeve, said tubular member at its end adjacent said sleeve having chamfered edges, said enlarged portion, sleeve and tubular member having substantially equal outside diameters, said pin having a diameter throughout its length approximately equal to the internal diameters of said sleeve and tubular member, the deformable section of said sleeve adapted to abut the blind side of said workpieces to be riveted, and the end of the frangible section of said sleeve engaging the enlarged portion of said pin whereby as said pin is drawn through said sleeve and said member toward the flange the deformable section is adapted to be forced against the blind side of one of said workpieces and outwardly from the axis of said pin until the frangible section is fractured and said sleeve falls away from said pin.

2. A blind rivet as described in claim 1, wherein said tubular member has a portion adapted to extend outwardly from said tubular flange at the open side of the work being riveted for gripping said pin, said last mentioned tubular portion presenting a surface whereby the exterior of said pin may be welded to the interior of said tubular member.

FERDINAND R. EICHNER.

References Cited in the file of this patent

UNITED STATES PATENTS

| Number | Name | Date |
| --- | --- | --- |
| 2,038,189 | Morris | Apr. 21, 1936 |
| 2,372,222 | Mullgardt | Mar. 27, 1945 |
| 2,527,307 | Huck | Oct. 24, 1950 |
| 2,531,270 | Hood | Nov. 21, 1950 |

FOREIGN PATENTS

| Number | Country | Date |
| --- | --- | --- |
| 743,881 | France | Apr. 7, 1933 |